US009784621B2

(12) United States Patent
Smith (10) Patent No.: US 9,784,621 B2
(45) Date of Patent: Oct. 10, 2017

(54) SPECTROSCOPIC APPARATUS AND METHODS (71) Applicant: RENISHAW PLC, Wotton-under-Edge, Gloucestershire (GB)

(72) Inventor: Brian John Edward Smith, Cam (GB)

(73) Assignee: RENISHAW PLC, Wotton-under-Edge (GB)

( * ) Notice: Subject to any disclaimer, the term of this patent is extended or adjusted under 35 U.S.C. 154(b) by 940 days.

(21) Appl. No.: 14/056,580

(22) Filed: Oct. 17, 2013

(65) Prior Publication Data
US 2014/0046630 A1 Feb. 13, 2014

Related U.S. Application Data (63) Continuation-in-part of application No. PCT/GB2012/000405, filed on May 3, 2012.

(30) Foreign Application Priority Data

May 5, 2011 (EP) .................................. 11250504
Jan. 19, 2012 (GB) .................................. 1200966.8
Oct. 25, 2012 (GB) .................................. 1219189.6

(51) Int. Cl.
*G01J 3/44* (2006.01)
*G01J 3/28* (2006.01)

(52) U.S. Cl.
CPC ............ *G01J 3/4406* (2013.01); *G01J 3/28* (2013.01); *G01J 3/44* (2013.01)

(58) Field of Classification Search
USPC .......................................................... 702/179
See application file for complete search history.

(56) References Cited

U.S. PATENT DOCUMENTS

| 5,442,438 A | 8/1995 | Batchelder et al. |
| 5,510,894 A | 4/1996 | Batchelder et al. |
| 2011/0246092 A1 | 10/2011 | Wright et al. |

FOREIGN PATENT DOCUMENTS

EP 2 520 914 A1 11/2012

OTHER PUBLICATIONS

O. Soyemi, Design and Testing of a Multivariate Optical Element: The First Demonstration of Multivariate Optical Computing for Predictive Spectroscopy, Analytical Chemistry, vol. 73, No. 6, Mar. 15, 2001, p. 1069-1079.*

(Continued)

*Primary Examiner* — Tung Lau
(74) *Attorney, Agent, or Firm* — Oliff PLC (57) ABSTRACT

A method of estimating background radiation in spectral data. The method may comprise, iteratively, fitting an analytical curve, such as a spline curve, to reference data, determining an allowable deviation of the reference data from the analytical curve and clipping data points of the reference data or the spectral data that are more than the allowable deviation above the analytical curve to provide the reference data for the next iteration until termination criterion is met. The reference data is initially based upon the spectral data. The method may comprise generating estimates of background radiation of the spectral data, each estimate based upon fitting a different order polynomial to the spectral data, and selecting an order of polynomial to use for estimating background radiation and/or one of the estimates of the background radiation. The method may further comprise estimating the noise in the spectral data from the reference data.

38 Claims, 5 Drawing Sheets

(56) References Cited

OTHER PUBLICATIONS

Narahara Chari Dingari, Wavelength selection-based nonlinear calibration for transcutaneous blood glucose sensing using Raman spectroscopy, Journal of Biomedical Optics 16(8), 087009 (Aug. 2011), 11 pages.*
Thomas J. Vickers, Curve Fitting and Linearity: Data Processing in Raman Spectroscopy, 2001 Society for Applied Spectroscopy, vol. 55, No. 4, 2001, p. 389-393.*
Beier et al. "Method for Automated Background Subtraction from Raman Spectra Containing Known Contaminants," *Analyst*, 2009, vol. 134, pp. 1198-1202.
Zhao et al., "Automated Autofluorescence Background Subtraction Algorithm for Biomedical Raman Spectroscopy," *Applied Spectroscopy*, 2007, vol. 61, No. 11, pp. 1225-1232.
Lieber et al., "Automated Method for Subtraction of Fluorescence from Biological Raman Spectra," *Applied Spectroscopy*, 2003, vol. 57, No. 11, pp. 1363-1367.
Gan et al., "Baseline Correction by Improved Iterative Polynomial Fitting with Automatic Threshold," *Chemometrics and Intelligent Laboratory Systems,* 2006, vol. 82, pp. 59-65.
Lan et al., "Automatic Baseline Correction of Infrared Spectra," *Chinese Optics Letters,* Oct. 2007, vol. 5, No. 10, pp. 613-616.
Feng et al., "A Novel Algorithm for Baseline Correction of Chemical Signals," 2009 Fifth International Conference on Natural Computation, *IEEE,* pp. 496-499.

International Search Report issued in International Patent Application No. PCT/GB2012/000405 dated Jan. 8, 2013.
Written Opinion issued in International Patent Application No. PCT/GB2012/000405 dated Jan. 8, 2013.
Search Report issued in British Application No. 1219189.6 dated Feb. 18, 2013.
Partial Search Report issued in European Patent Application No. 11 25 0504 dated Sep. 19, 2011.
Cao et al., "A Robust Method for Automated Background Subtraction of Tissue Fluoresence," *Journal of Raman Spectroscopy,* 2007, vol. 38, pp. 1199-1205.
Kuligowski et al., "Cubic Smoothing Splines Background Correction in On-Line Liquid Chromatography-Fourier Transform Infrared Spectrometry," *Journal of Chromatography A,* 2010, vol. 1217, pp. 6733-6741.
Partial International Search Report issued in International Patent Application No. PCT/GB2013/052772 dated Jan. 8, 2014.
Nov. 26, 2015 Office Action issued in Chinese Patent Application No. 201280021495.5.
Feb. 27, 2015 Office Action issued in Chinese Application No. 201280021495.5.
Apr. 8, 2016 Office Action issued in Chinese Patent Application No. 201280021495.5.
Mar. 8, 2016 Office Action issued in Japanese Patent Application No. 2014-508871.

* cited by examiner

SPECTROSCOPIC APPARATUS AND METHODS

This is a Continuation-in-Part of Application No. PCT/GB2012/000405 filed May 3, 2012 and GB 1219189.6 filed Oct. 25, 2012, which claim the benefit of Applications No. EP 11250504.5 filed May 5, 2011 and GB 1200966.8 filed Jan. 19, 2012. The disclosure of the prior applications are hereby incorporated by reference herein in their entirety.

FIELD OF THE INVENTION

This invention relates to spectroscopic apparatus and methods. It is particularly useful in Raman spectroscopy, though it can also be used in other forms of spectroscopy, e.g. narrow-line photoluminescence, fluorescence, cathodeluminescence, UV visible (UV Vis), nuclear magnetic resonance (NMR), mid infra-red (mid-IR) or near infra-red (NIR).

BACKGROUND TO THE INVENTION

The Raman Effect is the inelastic scattering of light by a sample. In Raman Spectroscopy, a sample is irradiated by monochromatic laser light and the scattered light is then dispersed by a dispersive device, such as a diffraction grating, e.g. in a monochromator, to generate a spectrum called a Raman spectrum. The Raman spectrum is detected by a detector such as a charge-coupled device (CCD). Examples of Raman spectroscopy apparatus are known from U.S. Pat. Nos. 5,442,438 and 5,510,894, which are incorporated herein by reference.

Different chemical compounds have different characteristic Raman spectra. Accordingly, the Raman effect can be used to analyse chemical compounds present in a sample.

The detected spectrum comprises the Raman spectrum together with a background signal whose intensity, particularly for biological samples, is orders of magnitude greater than the Raman spectrum. This background signal is typically due to, amongst other things, the substrate supporting the sample, fluorescence and an objective lens of the Raman apparatus. To analyse the Raman spectrum it is often first necessary to identify a proportion of the detected spectrum that can be attributed to background sources.

B. D. Beier and A. J. Berger, The Royal Society of Chemistry, 2009, 134, 1198-1202 discloses a method for automating the removal of background from a Raman signal using a polynomial fitting technique and a reference spectrum of a known spectral contaminant. In the example described, glass of a microscope slide is the known contaminant.

The method comprises an iterative algorithm wherein, to start with, an estimate of the background component is set as the detected spectrum. An initial estimate is made of the concentration of the known contaminant and a polynomial is fitted to the residual between the estimated background and the estimated contribution made by the known contaminant. The polynomial and the estimated contribution of the known contaminant form together a current estimate of the background. A new estimate of the background for the next iteration is determined by comparing the current estimate to the previous estimate of the background and retaining the minimum value at each wavenumber.

It is desirable to have a technique for automatically estimating the background that does not require knowledge of spectral components that contribute to the background.

Automated Autofluorescence Background Subtraction Algorithm for Biomedical Raman Spectroscopy, Jianhua Zhao, Harvey Lui, David I. McLean and Haishan Zeng, Applied Spectroscopy, Volume 61, number 11, 2007, pages 1225-1232, discloses an iterative method of estimating fluorescence background comprising fitting a polynomial to a spectrum. In the first iteration, the polynomial is fitted to the raw Raman spectrum. In each successive iteration, a polynomial is fitted to a modified spectrum. In the first iteration, the modified spectrum is formed using a peak removal step, wherein, for each wavenumber, the lower of a value equal to the polynomial plus a value DEV and the raw data value is retained. DEV is the standard deviation of a residual component the remains when the polynomial is taken away from the raw Raman data. For subsequent iterations, the modified spectrum is formed by retaining the lower value of the polynomial and the modified spectrum to which the polynomial was fitted.

Other methods of estimating fluorescence background wherein a polynomial is iteratively fitted to Raman data are disclosed in Automated Method for Subtraction of Fluorescence from Biological Raman Spectra, Chad A. Lieber and Anita Mahadevan-Jensen, Applied Spectroscopy, Volume 57, Number 11, 2003, pages 1363 to 1367 and Baseline Correction By Improved Iterative Polynomial Fitting with Automated Threshold, Feng Gan, Guihua Ruan, Jinyuan Mo, Chemometrics and intelligent Laboratory Systems, 82 (2006), pages 59-65.

SUMMARY OF INVENTION

According to a first aspect of the invention there is provided a method of estimating background radiation in spectral data, the method comprising, iteratively, fitting a polynomial to reference data, determining an allowable deviation of the reference data from the polynomial, clipping data points of the reference data or the spectral data that are more than the allowable deviation above the polynomial to provide the reference data for the next iteration until termination criterion is met, wherein the reference data is initially based upon the spectral data.

The polynomial tends to be fitted much more closely to the slowly varying spectrum of the background than the sudden spikes of the Raman spectrum of the sample. Accordingly, clipping data points of the reference data or spectral data that are more than the allowable deviation above the polynomial may remove the sharp Raman spectrum from the reference data whilst retaining the more slowly varying background components. In this way, it may not be necessary to make assumptions about contaminants in order to estimate the background. The polynomial of the final iteration may form the estimate of background radiation. However, further processing steps may be carried out to obtain a final estimate of the background radiation.

The polynomial may be a spline curve and, in particular, a cubic spline. The method may comprise fitting a spline curve to the reference data using a predefined number of anchor points (knots). The method may be computer implemented and the number of anchor points predefined by a user. The number of anchor points may be predefined based on the resolution of the spectroscopy apparatus used to obtain the spectral data or the likely widths of the Raman peaks.

Fitting of the spline curve may comprise identifying a location of the anchors. Identification of the locations of the anchors may be based upon the reference data or spectral data. The locations of the anchors for each iteration may be identified automatically using an algorithm.

The allowable deviation may be based upon a measure of deviation of the reference data or spectral data from the polynomial. For example, the measure of deviation may be an average deviation of the reference data from the polynomial and the allowable deviation a multiple, M, of the average deviation. Preferably, the measure is a root mean square, RMS of the reference data from the polynomial. However, it will be understood that the allowable deviation may be based on other suitable measures, such as standard deviation, mean of positive deviations only or mean of negative deviations only.

In another embodiment, the allowable deviation is based upon an estimate of noise in the reference data. Noise is fluctuations in the spectral data that are relatively small compared to other features of the background, such as spectral features of the substrate and objective lens and fluorescence, and the Raman spectra of the sample. Such noise may be generated by, amongst other things, electronic noise in the photo-detector and processing circuitry. The estimate of noise may be estimated from the spectral data or the reference data. The noise may be estimated from an average variation, such as an RMS variation, between each point of the spectral data or reference data and its nearest neighbour(s) or an average variation, such as an RMS variation, between each local minimum of the spectral data or reference data and its nearest neighbours (local minimum in the sense that the point is less than both of its neighbours). Alternatively, the estimate of noise may be based upon a deviation of the reference data from the polynomial/estimate of background radiation. Estimates of noise based upon the spectral data may overestimate the noise because of the presence of the Raman peaks. At least a proportion of the contribution from the Raman peaks has been clipped in order to form the reference data, and therefore, estimates of noise based upon the reference data may be more accurate. Preferably, a final/true estimate of noise is made using the reference data provided by the final iteration.

This final/true estimate of noise may be used in further analysis of the spectral data, for example when identifying the Raman spectra/spectrum present in the spectral data. For example, the estimate of noise may be used in an assessment of a fit of a model of Raman spectra to the spectral data.

Accordingly, in one aspect of the invention there is provided a method of estimating noise in spectral data comprising removing from the spectral data data points identified as corresponding to Raman peaks and estimating the noise in the spectral data from the remaining data points.

Clipping may comprise decimating, ie removing, data points from the reference data or spectral data. Alternatively, clipping may comprise setting the data points to a specified value above the polynomial, preferably, a value M×the average deviation above the polynomial.

The termination criterion may be when no clipping occurs in an iteration. Additionally or alternatively, the termination criterion may comprise a maximum number of iterations.

In one embodiment, the reference data may initially be set equal to the spectral data. However, in other embodiments, a certain level of pre-processing may be carried out on the spectral data.

The method may comprise determining an order of polynomial to fit to the reference data.

Accordingly, in accordance with a second aspect of the invention there is provided a method of estimating background radiation in spectral data, the method comprising generating estimates of background radiation of the spectral data, each estimate based upon fitting a different order polynomial to the spectral data, and selecting an order of polynomial to use for estimating background radiation and/or one of the estimates of the background radiation based upon a fitting criterion applied to the fitting of the different order polynomials.

The method automatically searches for a most suitable order polynomial for use in generating an estimate of background radiation in accordance with the fitting criterion. In this way, the "best" order polynomial in accordance with the fitting criterion is used for estimating the background.

The method may comprise fitting of the polynomials to reference data corresponding to the spectral data clipped to remove spectral components of interest, the fitting criterion corresponding to a measure of fit of the polynomial to the reference data.

The method may comprise generating estimates of the background radiation until the fitting criterion is or is not met. The order of the polynomial and/or estimate selected may be based upon the order of polynomial that caused the generation of estimates to be terminated.

Alternatively, terminating the generation of estimates may be based on criterion separate from the fitting criterion, the generated estimates then being searched based upon the fitting criterion to select the order of polynomial to use for estimating background radiation and/or one of the estimates of the background radiation.

The order of polynomial and/or estimate may be selected based on the highest order polynomial used for generating estimates whose fitting meets the fitting criterion.

In one embodiment, the method of generating each estimate is an iterative method, such as in accordance with the first aspect of the invention.

The fitting criterion may be a number, typically a maximum number, of iterations required before the iterative method terminates. For example, different order polynomials may be fitted to the spectral data to find a highest order polynomial that can be fitted to the spectral data within a set number of iterations. This may act as a measure of the stability of fit.

The fitting criterion may comprise a statistical significance of a highest order polynomial coefficient of a fitted polynomial. The method may comprise determining the statistical significance of a highest order polynomial coefficient used to generate an estimate and generating an estimate using a higher or a lower polynomial order based upon the determined statistical significance. For example, an estimate may be generated by fitting a polynomial of order, n, to the spectral data, deleting the highest order term in the fitted polynomial and determining whether there is a statistically significant difference between the fit of the polynomial to the estimate with and without the highest order term. If there is a statistical significant difference then an estimate is generated using a higher order polynomial, such as n+1. However, if there is no statistical significant difference then an estimate is generated using a lower order polynomial, such as n−1. These steps may be repeated until a sequence of increasing or a sequence of decreasing an order of the polynomial ends (because the highest order term is no longer statistically significant in the case of a sequence of increasing polynomial order or because the highest order term is statistically significant in the case a sequence of decreasing polynomial order). The statistical significance of the highest order term may be determined based upon an estimate of noise in the spectral data. For example, if changes in magnitude caused by the highest order term are within the estimated noise in the spectral data.

The fitting criterion may be a required distribution of the estimate relative to the fitted polynomial. For example, the fitting criterion may relate to a comparison of a local variation between the estimate and the fitted polynomial to a global variation of the estimate to the fitted polynomial. This may be a comparison of a difference between the estimate and fitted polynomial at each point to an average variation for all of the data points and whether this falls within an acceptable threshold. If there is a region, ie two or more consecutive points, where the variations are much greater than the average, then an estimate may be generated using a higher order polynomial.

According to a third aspect of the invention there is provided apparatus comprising a processor, the processor arranged to carry out the methods of the first and/or second aspects of the invention.

According to a fourth aspect of the invention there is provided a data carrier having stored thereon instructions, which, when executed by a processor, cause the processor to carry out the methods of the first and/or second aspects of the invention.

The data carrier may be a non-transient data carrier, such as volatile memory, eg RAM, non-volatile memory, eg ROM, flash memory and data storage devices, such as hard discs, optical discs, or a transient data carrier, such as an electronic or optical signal.

According to a fifth aspect of the invention there is provided a method of estimating background in spectral data, the method comprising, iteratively, fitting an analytical curve to reference data, determining an allowable deviation of the reference data from the analytical curve, clipping data points of the reference data or the spectral data that are more than the allowable deviation above the analytical curve to provide the reference data for the next iteration until termination criterion is met, wherein the reference data is initially based upon the spectral data.

The analytical curve may be a polynomial such as a spline curve or other suitable continuous curve that can be constructed using mathematical operations.

BRIEF DESCRIPTION OF THE DRAWINGS

Embodiments of the invention will now be described, by example only, with reference to the accompanying drawings, in which.

DESCRIPTION OF EMBODIMENTS

Figure 1:
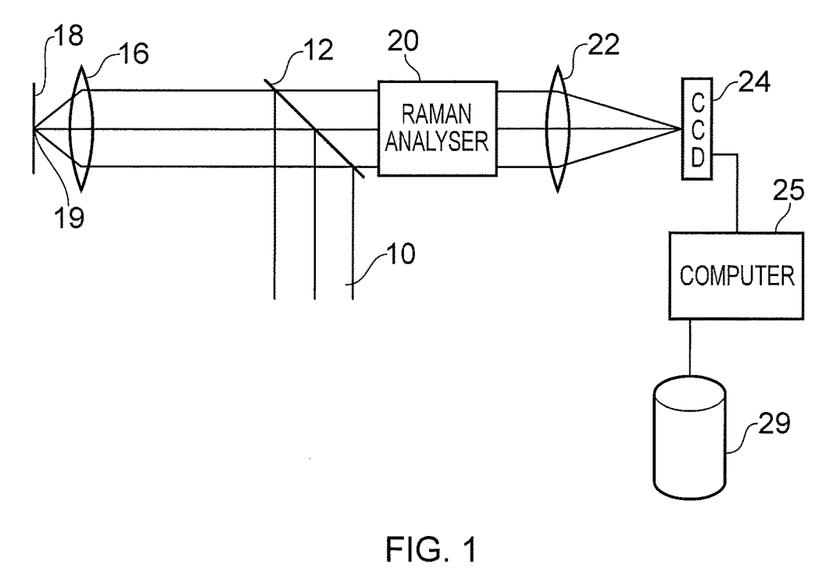
FIG. 1 shows apparatus according to one embodiment of the invention.

Referring to FIG. 1, apparatus according to the invention comprises a Raman spectrometer connected to a computer 25 that has access to memory 29.

The Raman spectrometer comprises an input laser beam 10 reflected through 90 degrees by a dichroic filter 12, placed at 45 degrees to the optical path. Alternatively a holographic dichroic filter may be placed at a low angle of incidence such as 10 degrees. The laser beam then passes to an objective lens 16, which focuses it to a spot at its focal point 19 on a sample 18. Light is scattered by the sample at this illuminated spot, and is collected by the objective lens 16 and collimated into a parallel beam which passes back to the dichroic filter 12. The filter 12 rejects Rayleigh scattered light having the same frequency as the input laser beam 10, and transmits the Raman scattered light. The Raman scattered light then passes to a Raman analyser 20.

The Raman analyser 20 comprises a dispersive element such as a diffraction grating. The light from the analyser 20 is focused by a lens 22 onto a suitable photo-detector. A photo-detector array is preferred. In the present embodiment the detector 24 is a charge-coupled device (CCD), which consists of a two-dimensional array of pixels, and which is connected to a computer 25 which acquires data from each of the pixels and analyses it as required. The analyser 20 produces a spectrum having various bands as indicated by broken lines 28, spread out in a line along the CCD 24.

Samples 18 may be mounted on an X-Y table so that the focal point 19 can be scanned across it in X and Y directions, e.g. under control of the computer. One spectrum is then collected for each sample The computer 25 is programmed with software code on a suitable medium, such as memory 29, comprising instructions, which when executed by a processor of computer 25 cause the computer 25 to perform the analysis routines described below. Alternatively, the data on the Raman spectrum/spectra obtained may be transferred to a separate computer having such software for this analysis. In either case, as the analysis proceeds, the values determined are stored in the computer concerned, and may be further processed and output or displayed to show the concentrations of the components in the sample/samples. In the case where the analysis is performed by computer 25, memory 29 has stored thereon a databank of component reference spectra to be used for the analysis. Each component reference spectrum is a typical Raman spectrum (a fingerprint) for a different chemical component or group of chemical components.

To process the spectral data to determine the Raman spectrum/spectra present and therefore, the chemical component(s) present in the sample, first the background (spectral components that are not Raman spectra of the sample) are identified and removed or factored into the analysis.

Figure 2A:
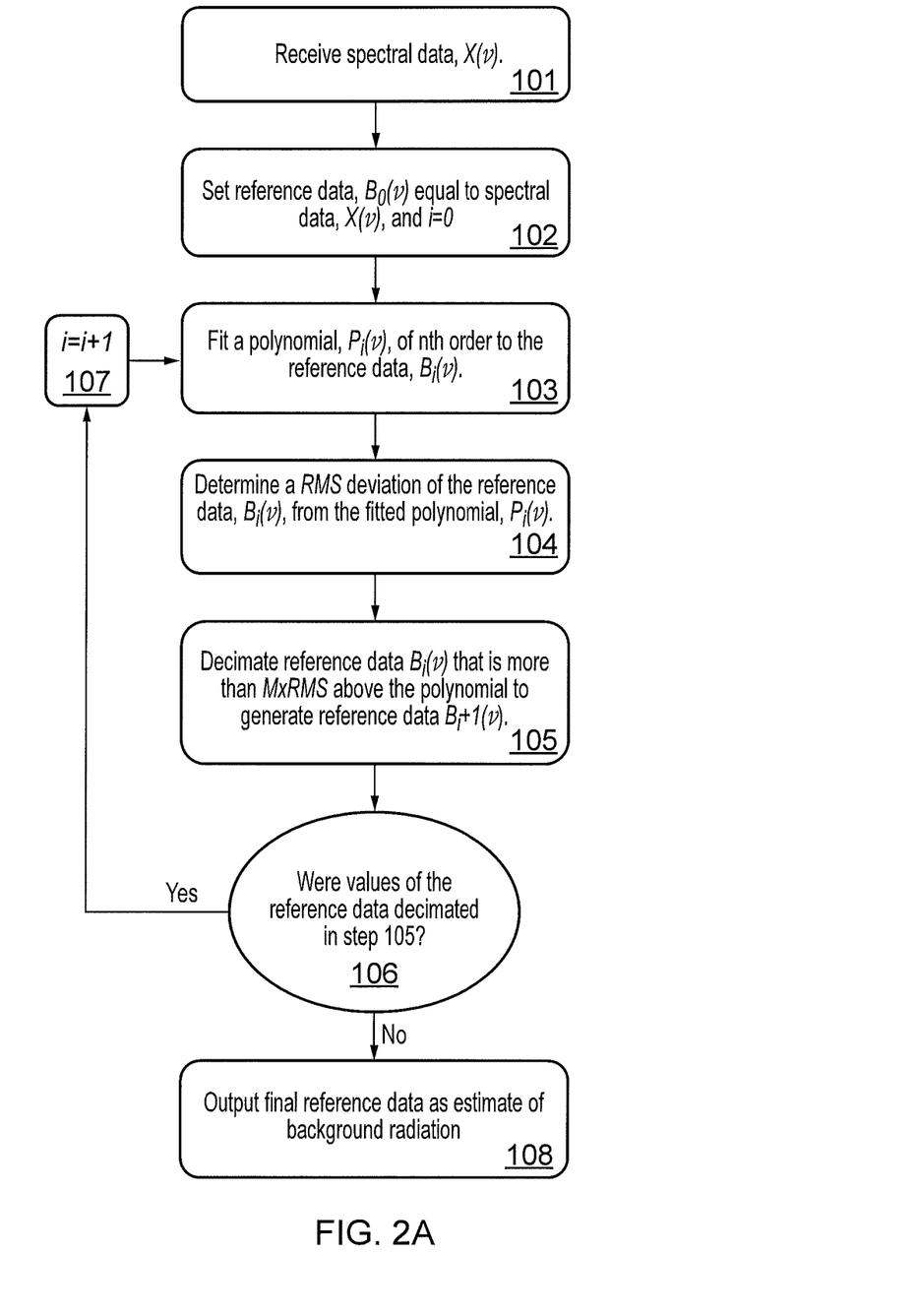
FIGS. 2a and 2b are flowcharts illustrating methods of estimating background radiation according to one embodiment of the invention.
Figure 2B:
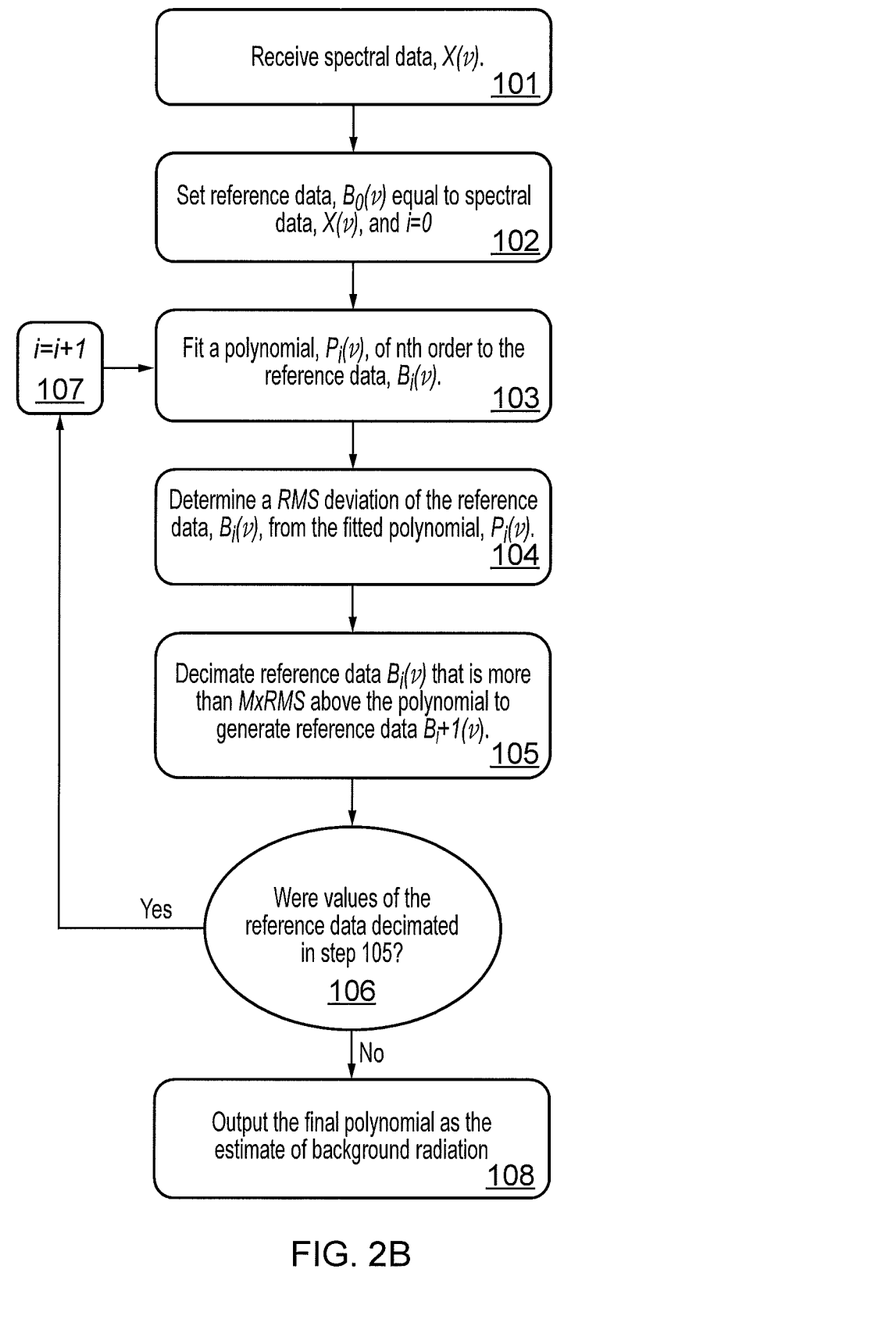

Referring to FIGS. 2a and 2b, an estimate of the background radiation in the spectral data is automatically made using an iterative process. After receiving the spectral data, 101, reference data is initially set equal to the spectral data 102. To this reference data, an nth order polynomial is fitted 103. An order of the polynomial to be used may be preset, for example the process may be preset to be a fifth order polynomial or alternatively, as described below with reference to FIG. 3, the order of the polynomial to be used for estimating the background may be determined by a suitable process.

In step 104, a deviation of each datum point of the reference data from the polynomial is determined and a root mean square (RMS) value is calculated for the deviations. The reference data is then modified, in this embodiment by decimating points that are more than an allowable deviation above the polynomial. In this embodiment, the allowable deviation is M×RMS, wherein M is a positive real number. M may be set by the user based upon noise in the spectral data.

In step 106, it is determined whether a termination criterion is met, in this embodiment, whether any points have been decimated in step 105. If points were removed from the reference data, the method proceeds to the next iteration, wherein a polynomial is fitted to the modified reference data. The iterative process continues until no points are decimated in step 105. In step 108, the fitted polynomial or reference data of the final iteration is output as an estimate of the background radiation.

The estimate of background radiation may be used in a technique, such as DCLS, for analysing the Raman spectra.

For use in further processing, such as in fitting of a model of Raman spectra to the spectral data, an estimate may be made of noise in the spectral data. The noise may be estimated by calculating an RMS variation between each point in the reference data provided by the final iteration.

In another embodiment, in step 105, rather than decimate the reference data, the spectral data is decimated to remove data points that are more than M×RMS above the polynomial to form the i+1th reference data to which a polynomial is fitted in step 103 of the next iteration. In this way, points of the spectral data that were removed in a previous iteration may be reintroduced. To implement such a method it may be necessary to introduce termination criteria to avoid an endless loop, such as where the same points are continuously removed and then reintroduced. In one embodiment, the termination criterion in step 106 is that the iterative process terminates after a set (maximum) number of iterations.

Figure 3:
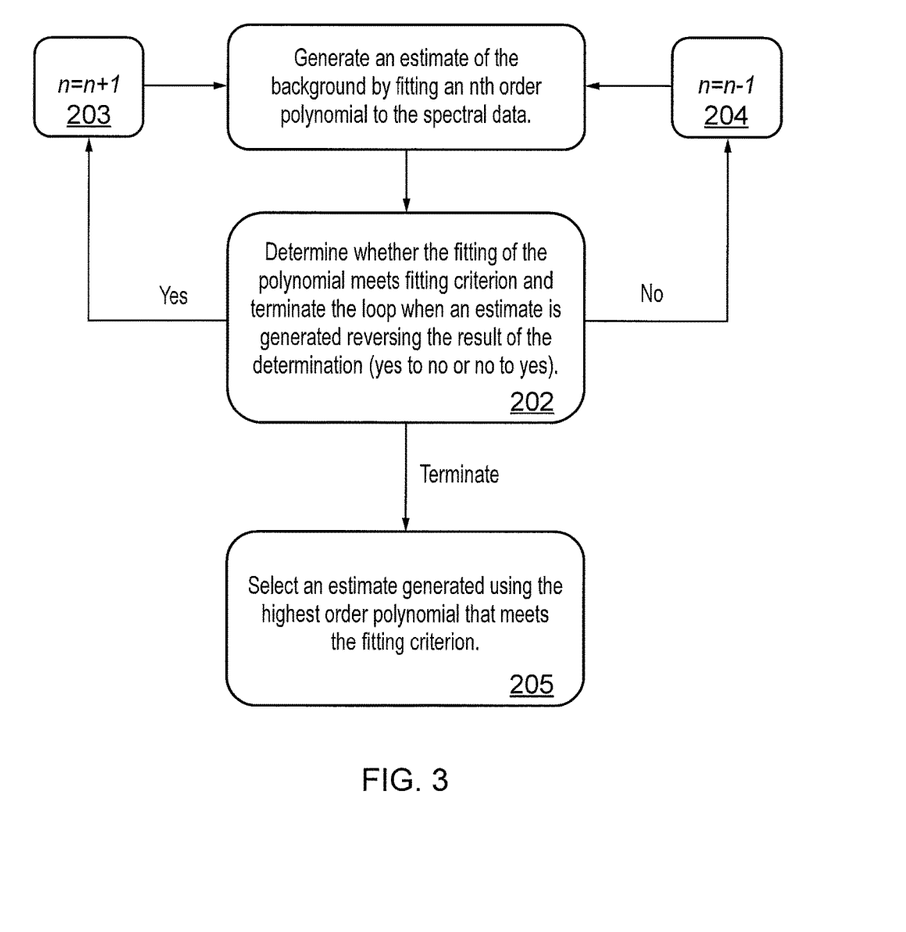
FIG. 3 is a flowchart illustrating a method of identifying a polynomial order for use in estimating background radiation according to one embodiment of the invention.

Referring to FIG. 3, rather than presetting the order of polynomial to use in estimating the background, the order of polynomial to use may be automatically determined.

In step 201 an estimate of background radiation in spectral data is determined by fitting an nth order polynomial to the spectral data. Such an estimate may be generated in the manner described with reference to FIG. 2 or in an alternative manner, such as described in the prior art. In step 202, a determination is made as to whether the fitting of the polynomial meets a fitting criterion. Three fitting criteria are described in more detail below. If the fitting meets the fitting criterion then a further estimate is generated using an n+1th order polynomial. If the fitting does not meet the fitting criterion then an estimate is generated using an n-1th order polynomial. This process is repeated to generate a sequence of estimates using an ever increasing or decreasing order of polynomial until a fitting reverses the result of the determination. For example, for a generation of estimates using an increasing order of polynomials, the process is terminated when an estimate is generated by fitting a polynomial that fails to meet the fitting criterion. For a generation of estimates using a decreasing order of polynomials, the process is terminated when an estimate is generated by fitting a polynomial that meets the fitting criterion.

In step 205, the estimate generated using the highest order polynomial whose fitting meets the fitting criterion is selected as an estimate of the background radiation. In an alternative arrangement, the method of FIG. 3 is used only for a first instance of spectral data, and the order of polynomial used to generate the selected estimate is then used for generating estimates for other spectral data. This may be suitable in situations where the nature of the background radiation is expected to be similar for different samples, such as when the samples are supported by the same substrate and Raman spectra are obtained using the same Raman spectroscopy apparatus. Use of the same order polynomial for estimating the background of a set of spectral data may be useful to give consistent analysis of a batch of spectral data (such as a batch of spectral data used to map a sample or a batch of spectral data taken of a sample over time) or in multivariate techniques that are applied to all data simultaneously where only one estimate of background can be used.

In one embodiment, the fitting criterion is a maximum number of iterations required for generating the estimate. This may act as a measure of the stability of fit.

In a further embodiment, the fitting criterion is a statistical significance of the highest order coefficient of the fitted polynomial. An estimate is generated using a polynomial of order, n, a highest order term of the polynomial fitted in the final iteration is deleted and a determination is made as to whether there is a statistically significant difference between the fit of this modified polynomial to the estimate (eg the output in step 108) relative to the unmodified polynomial. If there is a statistically significant difference then an estimate is generated using a higher order polynomial, such as n+1. However, if there is no statistically significant difference then an estimate is generated using a lower order polynomial, such as n-1. When an estimate is generated that results in a different finding in terms of the fitting criterion to the previously generated estimates, the generation of estimates is terminated. The estimate generated using the highest order polynomial that has a statistically significant highest order coefficient is used to estimate the background radiation.

In a further embodiment, the fitting criterion is a required distribution of the fitted polynomial relative to the estimate. A comparison is made of a local variation between the resolved polynomial and the estimate to a global variation of the resolved polynomial to the estimate. This may be a comparison of a difference between each point relative to an average variation for all of the data points. A determination is made as to whether this comparison falls within an acceptable threshold. If there is a region, ie two or more consecutive points, where the variations fall outside the threshold, then an estimate may be generated using a higher order polynomial.

Figure 4:
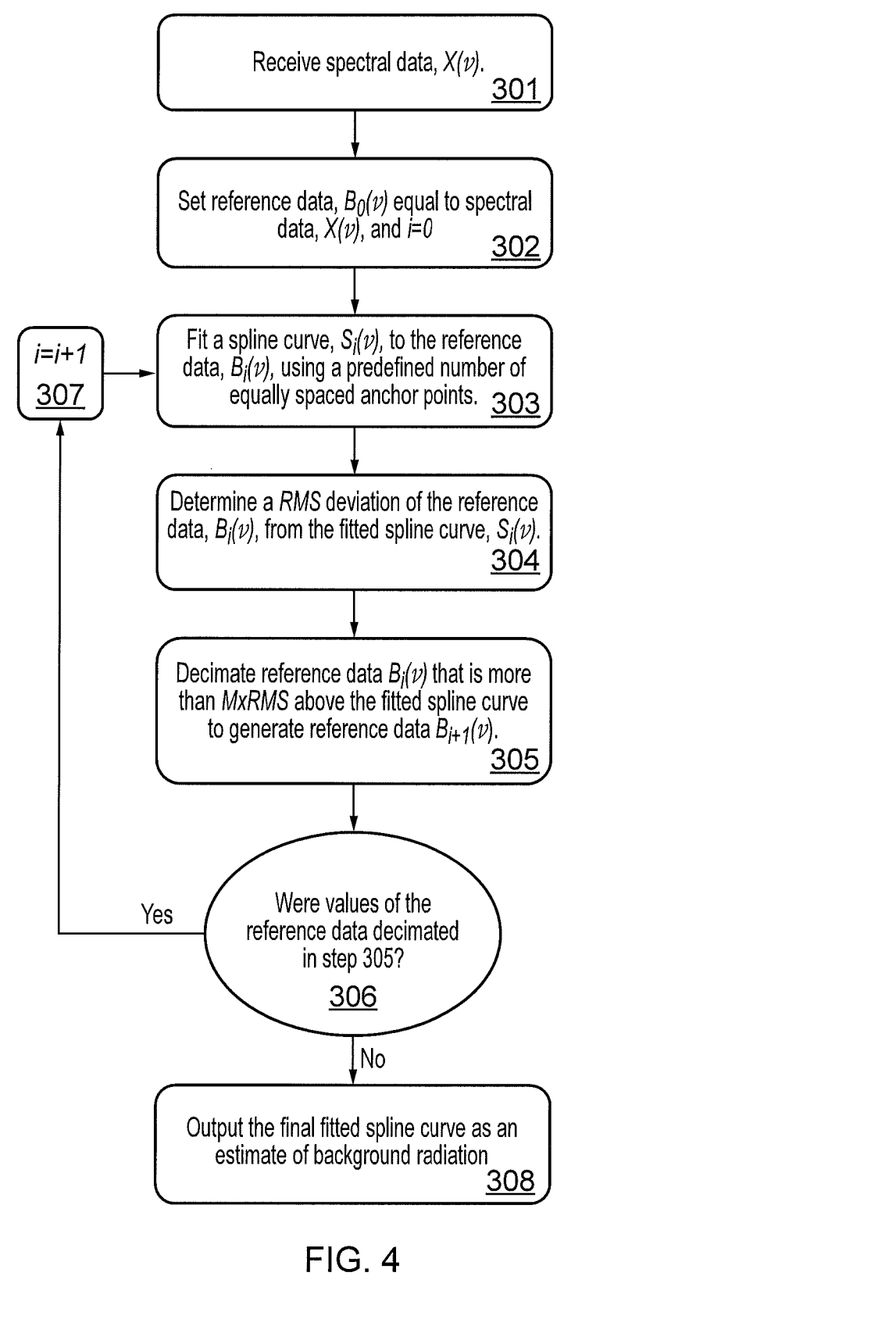
FIG. 4 is a flowchart illustrating a method of estimating background radiation according to another embodiment of the invention.

Referring to FIG. 4, an alternative embodiment for estimating background radiation in spectral data is shown. In this embodiment the polynomial that is fitted to the reference data is a spline curve. The spline curve comprises a plurality of polynomial segments connected at anchor points (also known as knots). In this embodiment, the number of anchor points is defined by the user.

The algorithm identifies locations for the anchor points based upon the reference spectrum using conventional methods and fits the polynomial segments to the anchor points at these locations. In this embodiment, the locations are equally spaced along the wavenumber/frequency axis. However, in another embodiment, the spacing of the anchor points along this axis may be defined in another way, for example, a higher density of anchor points may be used in areas of the spectra with greater variations in intensity.

As before, in step 304, a deviation of each datum point of the reference data from the spline curve is determined and a root mean square (RMS) value is calculated for the deviations. The reference data is then modified, in this embodiment by decimating points that are more than an allowable deviation above the spline curve. In this embodiment, the allowable deviation is M×RMS, wherein M is a positive real number. M may be set by the user based upon noise in the spectral data.

In step 306, it is determined whether a termination criterion is met, in this embodiment, whether any points have been decimated in step 305. If points were removed from the reference data, the method proceeds to the next iteration, wherein a spline curve is fitted to the modified reference data. The iterative process continues until no points are decimated in step 305. In step 308, the fitted spline curve of the final iteration is output as an estimate of the background radiation.

The invention claimed is:

1. A method for automatically estimating background in spectral data, the method comprising:
   receiving spectral data captured by a Raman spectroscopy apparatus, the spectral data comprising a Raman spectrum together with a background signal;
   carrying out an iterative process comprised of an initial iteration and a subsequent iteration, the initial iteration comprising (i) fitting an analytical curve to initial reference data based upon the received spectral data, (ii) determining an allowable deviation of the initial reference data from the analytical curve, and (iii) removing data points of the initial reference data or the spectral data that are more than the allowable deviation above the analytical curve to provide subsequent reference data, and each subsequent iteration comprising (i) fitting an analytical curve to the subsequent reference data, (ii) determining an allowable deviation of the subsequent reference data from the analytical curve, and (iii) removing data points of the subsequent reference data or the spectral data that are more than the allowable deviation above the analytical curve to provide reference data, wherein the reference data is used as the subsequent reference data in a next subsequent iteration of the iterative process unless termination criterion is met; and
   outputting an estimate of the background signal in the spectral data based upon the reference data or the analytical curve refined by the iterative process.

2. A method according to claim 1, wherein the analytical curve is a polynomial.

3. A method according to claim 1, wherein the analytical curve is a spline curve.

4. Apparatus comprising a processor arranged to perform the method according to claim 1.

5. A data carrier having instructions thereon, which, when executed by a processor, cause the processor to carry out the method of claim 1.

6. A method according to claim 1, comprising outputting the estimate of the background signal in the spectral data based upon the reference data or the analytical curve determined by the final iteration of the iterative process.

7. A method of identifying components present in a sample, the method comprising:
   carrying out Raman spectroscopy on the sample to obtain spectral data;
   carrying out the method of claim 1 on the spectral data to determine an estimate of background radiation in the spectral data;
   generating modified spectral data by removing data points based upon the estimate of background radiation; and
   identifying at least one component present in the sample by analysing the modified spectral data to identify a spectral signal indicative of the at least one component.

8. A method according to claim 2, wherein the allowable deviation is based upon an average deviation of the reference data from the polynomial.

9. A method according to claim 2, wherein the allowable deviation is based upon an estimate of noise.

10. A method according to claim 2, comprising estimating noise in the spectral data from the reference data.

11. A method according to claim 2, wherein the termination criterion is met when no removing occurs in an iteration.

12. A method according to claim 2, wherein the termination criterion is met when a set number of iterations are carried out.

13. A method according to claim 2, comprising determining an order of polynomial to fit to the reference data.

14. A method according to claim 3, wherein the spline curve is a cubic spline.

15. A method according to claim 3, comprising fitting a spline curve to the reference data using a predefined number of anchor points.

16. A method according to claim 3, wherein the number of anchor points is predefined based on the resolution of the spectroscopy apparatus used to obtain the spectral data.

17. A method according to claim 3, wherein the number of anchor points is predefined based on a likely width of the Raman peaks.

18. A method according to claim 3, wherein fitting of the spline curve comprises identifying a location of anchors.

19. A method according to claim 3, wherein the allowable deviation is based upon an average deviation of the reference data from the spline curve.

20. A method according to claim 3, wherein the allowable deviation is based upon a root mean square, RMS, of the reference data from the spline curve.

21. A method according to claim 3, wherein the allowable deviation is based upon an estimate of noise.

22. A method according to claim 3, comprising estimating noise in the spectral data from the reference data.

23. A method according to claim 3, wherein the termination criterion is met when no removing occurs in an iteration.

24. A method according to claim 23, wherein the termination criterion is met when a set number of iterations are carried out.

25. A method according to claim 3, wherein the termination criterion is met when a set number of iterations are carried out.

26. A method according to claim 3, comprising determining an order of spline curve to fit to the reference data.

27. A method according to claim 8, wherein the allowable deviation is based upon a root mean square, RMS, of the reference data from the polynomial.

28. A method according to claim 8, wherein the allowable deviation is a multiple, M, of the average deviation.

29. A method according to claim 9, wherein the estimate of noise is based upon an average variation between each point of the reference data.

30. A method according to claim 9, wherein the estimate of noise is based upon a deviation of the reference data from the polynomial/estimate of background radiation.

31. A method according to claim 9, comprising making an estimate of noise using the reference data provided by a final iteration.

32. A method according to claim 11, wherein the termination criterion is met when a set number of iterations are carried out.

33. A method according to claim 15, wherein the method is computer implemented and the number of anchor points is predefined by a user.

34. A method according to claim 18, wherein the locations of the anchors for each iteration are identified automatically using an algorithm.

35. A method according to claim 19, wherein the allowable deviation is a multiple, M, of the average deviation.

36. A method according to claim 22, wherein the estimate of noise is based upon an average variation between each point of the reference data.

37. A method according to claim 22, wherein the estimate of noise is based upon a deviation of the reference data from the spline curve/estimate of background radiation.

38. A method according to claim 22, comprising making an estimate of noise using the reference data provided by a final iteration.

* * * * *